United States Patent
Propheter-Hinckley et al.

(10) Patent No.: US 10,294,798 B2
(45) Date of Patent: May 21, 2019

(54) GAS TURBINE ENGINE COMPONENT HAVING SURFACE INDICATOR

(71) Applicant: UNITED TECHNOLOGIES CORPORATION, Hartford, CT (US)

(72) Inventors: Tracy A. Propheter-Hinckley, Manchester, CT (US); Peter Holman Thomas, Singapore (SG)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 726 days.

(21) Appl. No.: 14/766,188

(22) PCT Filed: Feb. 14, 2013

(86) PCT No.: PCT/US2013/026073
§ 371 (c)(1),
(2) Date: Aug. 6, 2015

(87) PCT Pub. No.: WO2014/126565
PCT Pub. Date: Aug. 21, 2014

(65) Prior Publication Data
US 2015/0369054 A1    Dec. 24, 2015

(51) Int. Cl.
*B22C 9/10* (2006.01)
*F01D 5/00* (2006.01)
(Continued)

(52) U.S. Cl.
CPC ............. *F01D 5/185* (2013.01); *B22C 9/103* (2013.01); *B22C 9/108* (2013.01); *F01D 5/186* (2013.01);
(Continued)

(58) Field of Classification Search
CPC .......... F01D 5/185; F01D 5/186; F01D 5/187; F01D 5/005; F01D 5/18; G01M 15/14;
(Continued)

(56) References Cited

U.S. PATENT DOCUMENTS

| 4,820,123 A | 4/1989 | Hall |
| 5,291,654 A | 3/1994 | Judd et al. |

(Continued)

FOREIGN PATENT DOCUMENTS

| EP | 1 715 139 A2 | 10/2006 |
| EP | 1790823 | 5/2007 |

(Continued)

OTHER PUBLICATIONS

Search Report and Written Opinion, Singapore Patent Application No. 11201505736U, dated Feb. 11, 2016.

(Continued)

*Primary Examiner* — Mark A Laurenzi
*Assistant Examiner* — Mickey H France
(74) *Attorney, Agent, or Firm* — Carlson, Gaskey & Olds, P.C.

(57) ABSTRACT

A component for a gas turbine engine according to an exemplary aspect of the present disclosure includes, among other things, a body portion, a cooling circuit disposed within the body portion and including at least a first cavity, a core in fluid communication with the first cavity, and an exit surface that extends through an exterior surface of the body portion. At least one surface indicator is visible near the exit surface.

20 Claims, 5 Drawing Sheets

(51) Int. Cl.
*F01D 5/18* (2006.01)
*G01M 15/14* (2006.01)

(52) U.S. Cl.
CPC .............. *F01D 5/187* (2013.01); *G01M 15/14* (2013.01); *F01D 5/005* (2013.01); *F05D 2230/18* (2013.01); *F05D 2260/204* (2013.01); *F05D 2260/80* (2013.01)

(58) Field of Classification Search
CPC ........... B22C 9/103; B22C 9/108; B22C 9/10; B22C 9/04; B22C 7/02; B22C 21/14; F05D 2260/80; F05D 2260/204; F05D 2230/18; F05D 2230/21; F05D 2240/81; Y10T 29/49339; Y10T 29/49341
USPC ........................................................ 73/112.01
See application file for complete search history.

(56) References Cited

U.S. PATENT DOCUMENTS

| | | |
|---|---|---|
| 6,402,470 B1 | 6/2002 | Kvasnak et al. |
| 6,896,487 B2 | 5/2005 | Cunha et al. |
| 6,942,450 B2 | 9/2005 | Yang et al. |
| 7,052,233 B2 | 5/2006 | Fried et al. |
| 7,128,530 B2 | 10/2006 | Anguisola McFeat et al. |
| 7,507,075 B2 | 3/2009 | Kang et al. |
| 7,690,894 B1 | 4/2010 | Liang |
| 7,695,243 B2 | 4/2010 | Lee et al. |
| 7,815,414 B2 | 10/2010 | Devore et al. |
| 8,137,068 B2 | 3/2012 | Surace et al. |
| 8,322,973 B2 | 12/2012 | Shang et al. |
| 2005/0247425 A1 | 11/2005 | Devine, II et al. |
| 2007/0016569 A1 | 1/2007 | Cauvin et al. |
| 2007/0059171 A1 | 3/2007 | Simms et al. |
| 2010/0014102 A1 | 1/2010 | Blair |
| 2011/0299990 A1 | 12/2011 | Marra et al. |
| 2012/0034097 A1 | 2/2012 | Marra et al. |
| 2012/0163992 A1 | 6/2012 | Propheter-Hinckley et al. |

FOREIGN PATENT DOCUMENTS

| | | |
|---|---|---|
| EP | 1 876 325 A2 | 1/2008 |
| EP | 1 923 153 A1 | 5/2008 |
| EP | 2 000 232 A1 | 12/2008 |
| EP | 2 468 433 A2 | 6/2012 |
| EP | 2565383 | 3/2013 |
| WO | 2006127159 A1 | 11/2006 |

OTHER PUBLICATIONS

Partial Supplementary European Search Report for Application No. EP 13 87 5227 dated Oct. 6, 2016.
Written Opinion of the Intellectual Property Office of Singapore for Sinapore Application No. 11 2015 05736U dated Oct. 18, 2016.
The Extended European Search Report for EP Application No. 13875227.4, dated Feb. 15, 2017.
International Search Report and Written Opinion of the International Searching Authority for International application No. PCT/US2013/026073 dated Nov. 8, 2013.
International Preliminary Report on Patentability for International application No. PCT/US2013/026073 dated Aug. 27, 2015.

GAS TURBINE ENGINE COMPONENT HAVING SURFACE INDICATOR

BACKGROUND

This disclosure relates to a gas turbine engine, and more particularly to a component that includes a core having at least one surface indicator visible near an exit surface of the core to indicate whether the component is within an acceptable manufacturing tolerance.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section which extracts energy from the hot combustion gases to power the compressor section and other gas turbine engine loads.

Due to exposure to hot combustion gases, some components of a gas turbine engine may include cooling circuits that receive and circulate cooling airflow to cool various internal and external surfaces. Such cooling circuits may include microcircuits that are disposed within a body portion of the component to create a dual wall configuration. The microcircuits are in fluid communication with a cavity of the cooling circuit and the exterior surface of the body portion.

In order to exit the component, the exit surface of the core is bulged above the nominal surface of the body portion and may be covered with wax (prior to casting). This wax subsequently becomes a raised metal surface surrounding the exit in the cast component. The raised surface must typically be ground off by hand to provide flush or near flush core exits.

SUMMARY

A component for a gas turbine engine according to an exemplary aspect of the present disclosure includes, among other things, a body portion, a cooling circuit disposed within the body portion and including at least a first cavity, a core in fluid communication with the first cavity, and an exit surface that extends through an exterior surface of the body portion. At least one surface indicator is visible near the exit surface.

In a further non-limiting embodiment of the foregoing component, the body portion is an airfoil of at least one of a blade and a vane.

In a further non-limiting embodiment of either of the foregoing components, the body portion is part of a blade outer air seal (BOAS).

In a further non-limiting embodiment of any of the foregoing components, the body portion is part of a mid-turbine frame.

In a further non-limiting embodiment of any of the foregoing components, the body portion is part of a combustor panel.

In a further non-limiting embodiment of any of the foregoing components, the exit surface includes at least one discharge opening.

In a further non-limiting embodiment of any of the foregoing components, the at least one surface indicator is visible near at least one of a leading edge, a trailing edge, an inner diameter and an outer diameter of a discharge opening of the exit surface.

In a further non-limiting embodiment of any of the foregoing components, a plurality of surface indicators are visible near the exit surface.

In a further non-limiting embodiment of any of the foregoing components, a first portion of the plurality of surface indicators are located at a leading edge of a discharge opening of the exit surface and a second portion of the plurality of surface indicators are located at a trailing edge of the discharge opening.

In a further non-limiting embodiment of any of the foregoing components, the at least one surface indicator is presented in a predetermined pattern that indicates whether the component is within an acceptable manufacturing tolerance.

In a further non-limiting embodiment of any of the foregoing components, the core is a microcircuit.

In a further non-limiting embodiment of any of the foregoing components, the core is a trailing edge, pressure side discharge core.

A method for determining whether a component is within an acceptable manufacturing tolerance, according to another exemplary aspect of the present disclosure includes, among other things, inspecting the component to determine whether a surface indicator is visible in the component after the component has been manufactured and determining whether the component is within the acceptable manufacturing tolerance based on a predetermined pattern of the surface indicator that is visible in the component.

In a further non-limiting embodiment of the foregoing method, the component includes a cooling circuit having at least a first cavity, a core in fluid communication with the first cavity, and an exit surface that extends through an exterior surface of the component.

In a further non-limiting embodiment of either of the foregoing methods, the surface indicator is visible near the exit surface.

In a further non-limiting embodiment of any of the foregoing methods, the method comprises a step of performing a secondary operation on the component where the predetermined pattern reveals that the exit surface is above or at an upper control limit of the acceptable manufacturing tolerance.

In a further non-limiting embodiment of any of the foregoing methods, the method comprises the step of rejecting the component where the predetermined pattern reveals that the exit surface is below or at a lower control limit of the acceptable manufacturing tolerance.

A casting system for manufacturing a component according to an exemplary aspect of the present disclosure includes, among other things, a casting article having a body, a diffusion exit surface connected to a first portion of the body and at least one surface indicator feature that leaves a mark in the component.

In a further non-limiting embodiment of the foregoing casting system, the casting article is one of a ceramic core or a refractory metal core (RMC).

In a further non-limiting embodiment of either of the foregoing casting systems, at least one entrance rod is connected to a second portion of the body.

The various features and advantages of this disclosure will become apparent to those skilled in the art from the following detailed description. The drawings that accompany the detailed description can be briefly described as follows.

DETAILED DESCRIPTION

Figure 1:
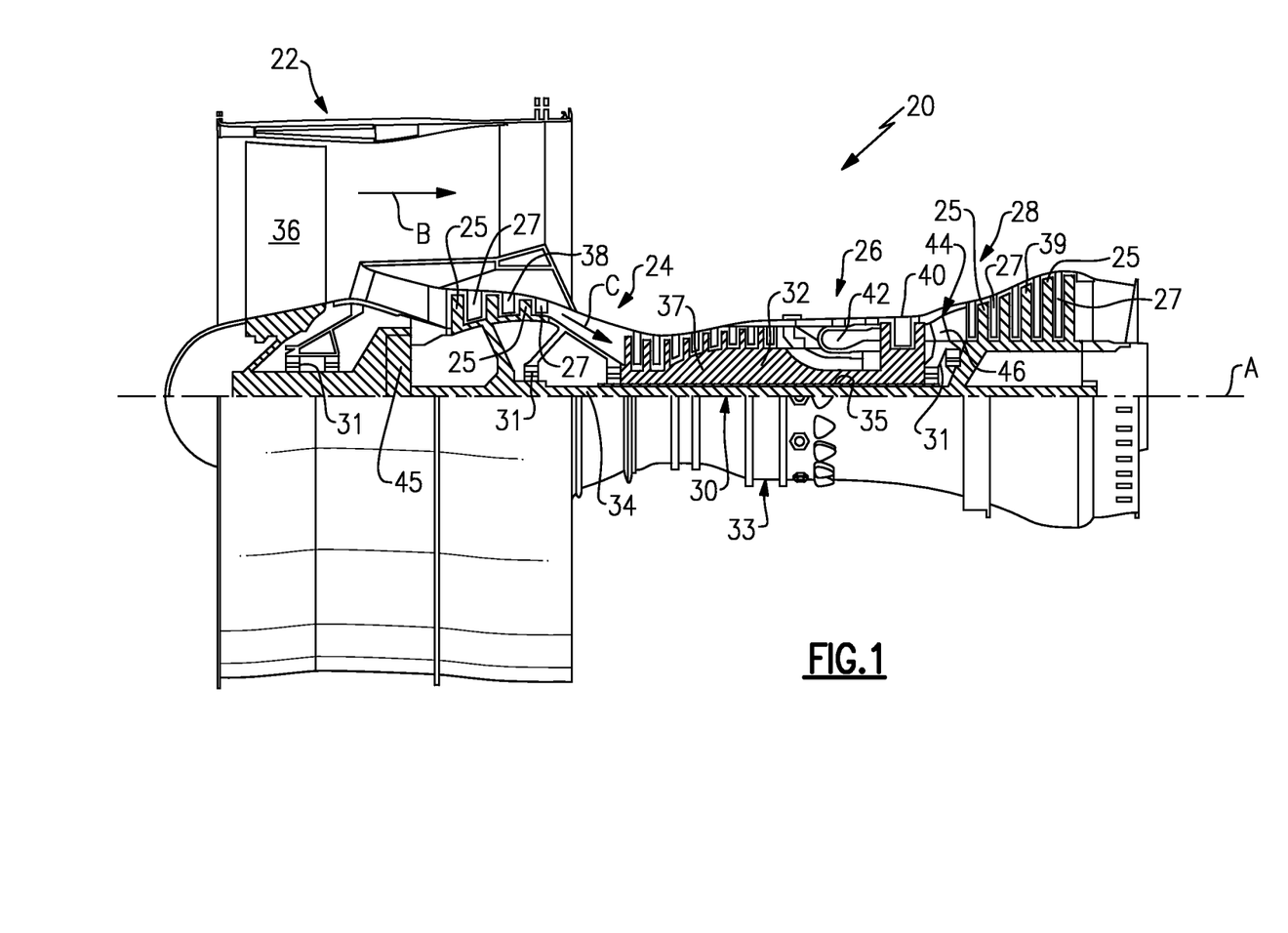
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be implemented.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of the gas turbine engine 20, such as airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as microcircuits or side discharging cores having one or more surface indicators that indicate whether a component is within an acceptable manufacturing tolerance are detailed below.

Figure 2:
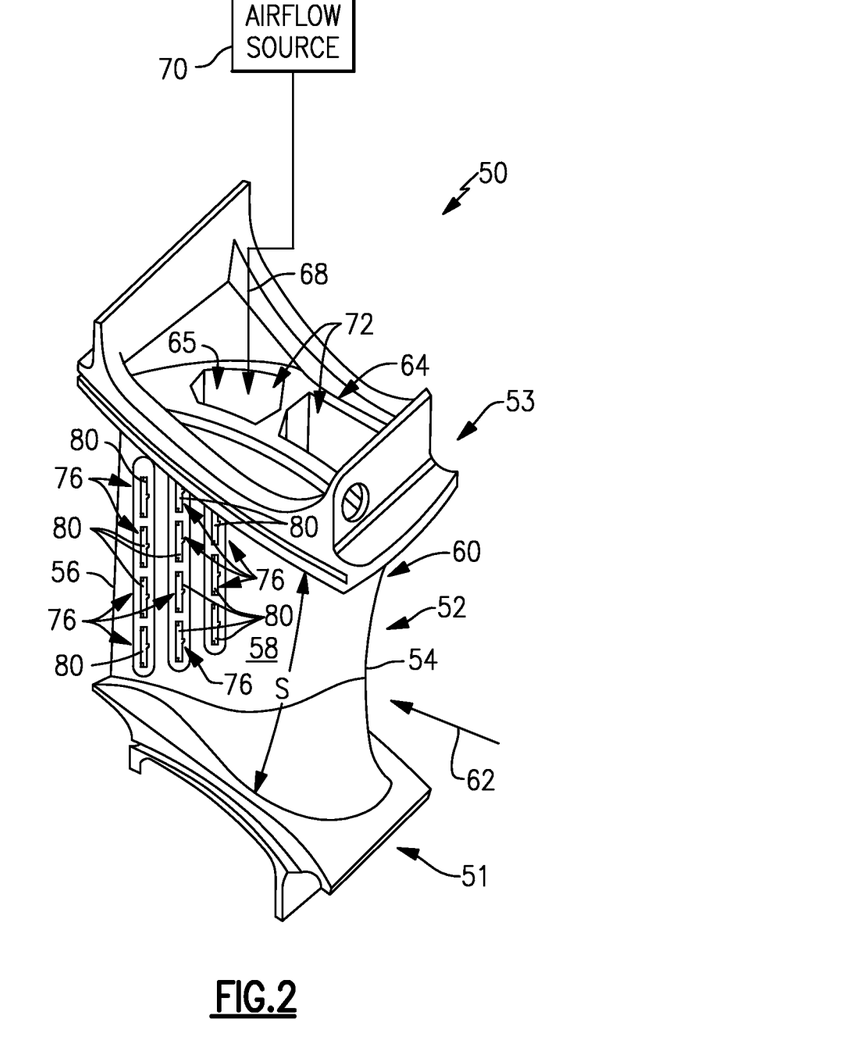
FIG. 2 illustrates a component that can be incorporated into a gas turbine engine.

FIG. 2 illustrates a component 50 that can be incorporated into a gas turbine engine, such as the gas turbine engine 20 of FIG. 1. The component 50 includes a body portion 52 that axially extends between a leading edge 54 and a trailing edge 56 and circumferentially extends between a pressure side 58 and a suction side 60. The body portion 52 can also extend radially across a span S. In this embodiment, the body portion 52 is representative of an airfoil. For example, the body portion 52 could be an airfoil that extends between an inner diameter platform 51 and an outer diameter platform 53 where the component 50 is a vane, or could extend from platform and root portions (not shown) where the component 50 is a blade. Alternatively, the body portion 52 could be a non-airfoil portion of a component.

A gas path 62 is communicated axially downstream through the gas turbine engine 20 along the core flow path C (see FIG. 1) in a direction that extends from the leading edge 54 toward the trailing edge 56 of the body portion 52. The gas path 62 represents communication of core airflow along the core flow path C.

The body portion 52 can also include a cooling circuit 64 for cooling the internal and external surfaces of the component 50. The cooling circuit 64 can include one or more cavities 72 as well as one or more cores 76 (see also FIG. 3), such as a microcircuit or other side discharging core, that may be radially, axially and/or circumferentially disposed inside of the body portion 52 to establish cooling passages for receiving a cooling airflow 68 to cool the component 50. For example, the cooling circuit 64 can include an inlet 65 that receives the cooling airflow 68 from an airflow source 70 that is external to the component 50. The cooling airflow 68 is generally of a lower temperature than the airflow of the gas path 62 that is communicated across the body portion 52. In one example, the cooling airflow 68 is a bleed airflow that can be sourced from the compressor section 24 or any other portion of the gas turbine engine 20 that is of a higher pressure and lower temperature than the component 50. The cooling airflow 68 can be circulated through the cooling circuit 64, including through the microcircuits 76, to transfer thermal energy from the component 50 to the cooling airflow 68 thereby cooling the internal and external surfaces of the component 50. The cooling airflow 68 exits the cooling circuit 64 through discharge openings 80 that extend through the body portion 52. In this embodiment, the discharge openings 80 exit through the pressure side 58 of the body portion 52 to return the cooling airflow 68 to the gas path 62. However, the discharge openings 80 may be positioned at other locations of the body portion 52 including but not limited to the suction side 60.

The exemplary cooling circuit 64 can be incorporated within any component that requires dedicated cooling, including but not limited to any component that is positioned within the core flow path C (FIG. 1) of the gas turbine engine 20. In the illustrated embodiments and for purposes of providing detailed examples herein, the exemplary cooling circuits of this disclosure are illustrated with respect to airfoils, such as those of the vanes and/or blades of the compressor section 24 or the turbine section 28. It should be understood; however, that the teachings of this disclosure are not limited to these applications and could extend to other components of the gas turbine engine 20 that may be exposed to relatively harsh operating conditions, including but not limited to blade outer air seals (BOAS), mid-turbine frames, combustor panels, etc.

Figure 3:
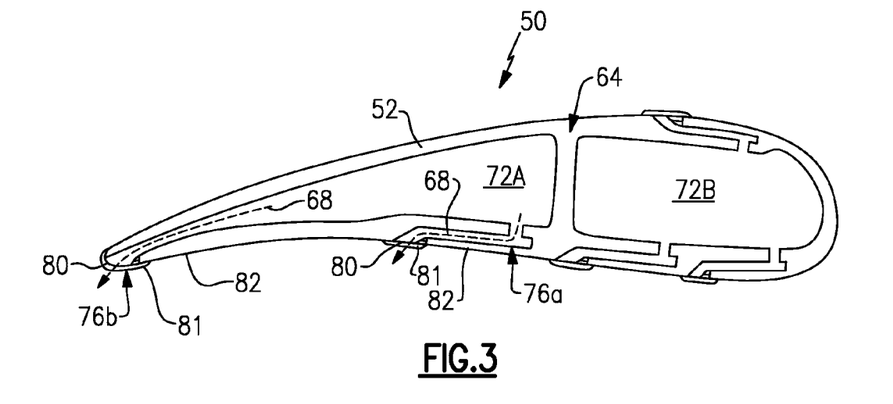
FIG. 3 illustrates an exemplary cooling circuit of a component of a gas turbine engine.

FIG. 3 (with continued reference to FIG. 2) illustrates portions of an exemplary cooling circuit 64 that can be incorporated into a component 50. The cooling circuit 64 is generally defined inside of the body portion 52. In this exemplary embodiment, the cooling circuit 64 establishes a multipath cooling passage that includes a first cavity 72A and a second cavity 72B. It should be understood that the cooling circuit 64 could include fewer or additional numbers of cavities. The first and second cavities 72A, 72B can communicate the cooling airflow 68 through the cooling circuit 64 along a serpentine or linear path. The cooling circuit 64 can further include one or more cores 76 that are in fluid communication with at least one of the first and second cavities 72A, 72B.

The cores 76 can represent miniature cooling cavities positioned just within the outer skin of the body portion 52 to create a dual wall configuration or can provide trailing edge discharge. Each core 76 may include an exit surface 81 that extends through an exterior surface 82 of the body portion 52. Each exit surface 81 can include one or more discharge openings 80. In one example, the discharge opening 80 may be a discharge slot, although other shapes are also contemplated. In the illustrated embodiment, a first core 76a is a microcircuit of the cooling circuit 64 and the second core 76b is a discharge core that can be used at a trailing edge pressure side discharge or other locations.

Figure 4A:
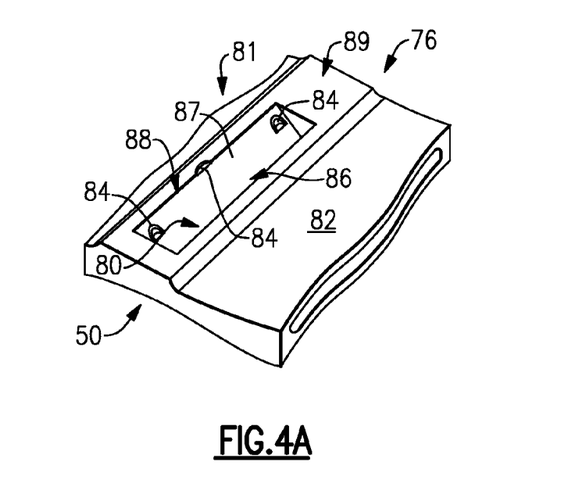
FIGS. 4A-4C illustrate portions of a core that can be incorporated into a component of a gas turbine engine.
Figure 4B:
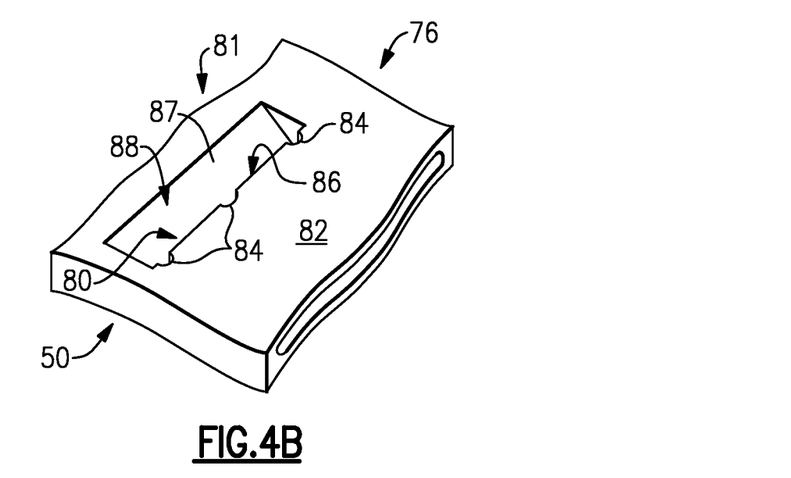
Figure 4C:
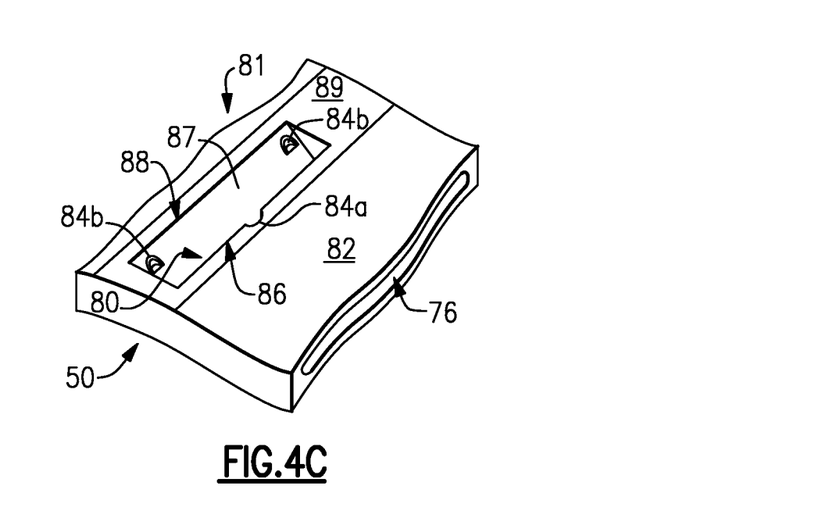

FIGS. 4A-4C illustrate exemplary exit surfaces 81 of an exemplary circuit 76. The core 76 can be a microcircuit or any side discharging core. The discharge opening 80 of each exit surface 81 extends through an exterior surface 82 of the body portion 52. One or more surface indicators 84 can be positioned (and visible) near the exit surface 81 to indicate whether the component 50 is within an acceptable manufacturing tolerance after the component 50 has been manufactured, such as in a casting operation. That is, the surface indicators 84 signify to a part inspector that the wall thickness of the component 50 has not been compromised and allow the part inspector to identify whether secondary operations are required to provide a flush or near flush exit surface 81.

In these examples, the surface indicator(s) 84 is a generally thumbnail shaped formation formed at or near the exit surface 81. However, other shapes are also contemplated as within the scope of this disclosure. In one embodiment, the surface indicators 84 are formed within the discharge opening 80 of the exit surface 81. In another embodiment, the surface indicators 84 can also be located at a sloped wall 87 of the exit surface 81 (see FIGS. 4A and 4C).

The surface indicator(s) 84 can be presented in a predetermined pattern to indicate whether the component is within an acceptable manufacturing tolerance. For example, the surface indicator(s) 84 can be located at one or both of a leading edge 86 and a trailing edge 88 of the discharge opening 80. The surface indicators 84 of FIG. 4A are formed at the trailing edge 88 (with none visible at the leading edge 86) of the discharge opening 80. This particular pattern shown in FIG. 4A signifies to a part inspector that additional secondary operations, such as sanding or grinding operations, are required to remove a raised surface 89 of the exit surface 81 to provide a flush or near flush exit surface 81. In other words, the predetermined pattern reveals that the exit surface 81 is above or at an upper control limit (see FIG. 5A) of the acceptable manufacturing tolerance.

In the embodiment of FIG. 4B, the surface indicators 84 are positioned at the leading edge 86 (with none visible at the trailing edge 88) of the discharge opening 80. This would signify to a part inspector that the component 50 is outside of the acceptable manufacturing tolerance and that the component 50 should be rejected and/or scrapped. For example, the wall thickness of the component 50 may be too thin. In other words, the predetermined pattern reveals that the exit surface 81 is below or at a lower control limit (see FIG. 5A) of the acceptable manufacturing tolerance.

FIG. 4C illustrates a pattern in which the surface indicators 84 are visible at both the leading edge 86 and the trailing edge 88 of the discharge opening 80. In this example, a first portion 84a of the surface indicators 84 are visible at the leading edge 86 and a second portion 84b of the surface indicators 84 are visible at the trailing edge 88. This particular pattern signifies to a part inspector that the component 50 is within the acceptable manufacturing tolerance. As can be appreciated, incorporation of the surface indicators 84 within a manufactured component may significantly reduce inspection time required to determine whether a component is within an acceptable manufacturing tolerance.

Figure 5A:
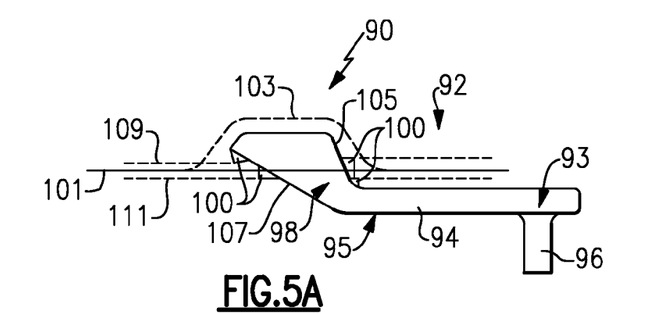
FIGS. 5A-5C illustrate portions of a casting system that can be used to manufacture a gas turbine engine component having at least one surface indicator.
Figure 5B:
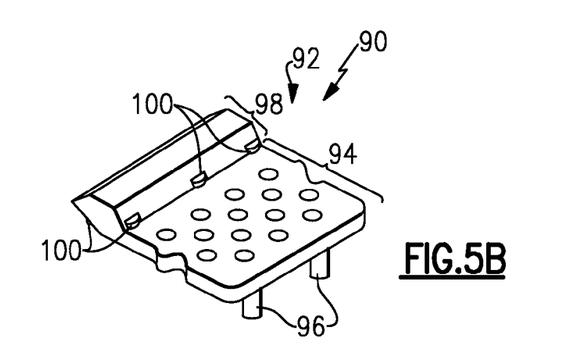
Figure 5C:
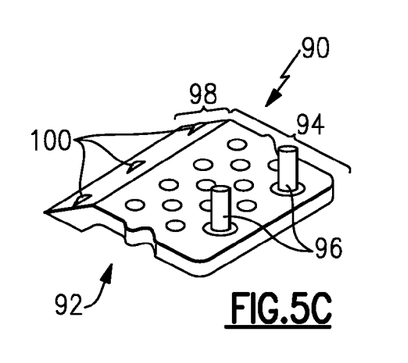

FIGS. 5A-5C illustrate portions of a casting system 90 that can be used to form a core 76 having the features shown in FIGS. 4A-4C within a component 50. In one embodiment, the casting system 90 includes a casting article 92. The casting article 92 may be a ceramic core, a refractory metal core (RMC), a hybrid core (for example, a combination of a ceramic core and a RMC core) or any other type of core that can be used in a casting operation. The casting article 92 could also be another portion of the casting system 90, such as a shell, for example. In this embodiment, the casting article 92 represents the dimensional negative of the core 76 that is formed within the component 50.

In one embodiment, the casting article 92 includes a body 94, one or more entrance rods 96 connected to a first portion 93 of the body 94, a diffusion exit surface 98 connected to a second portion 95 of the body 94 that is on an opposite end of the body 94 from the first portion 93, and at least one surface indicator feature 100. One the component 50 is manufactured, the entrance rods 96 represent the portion of the core 76 that connects to one of the cavities 72 (see FIGS. 2-3). The diffusion exit surface 98 forms the exit surface 81 of the core 76 in the manufactured component 50. The diffusion exit surface 98 extends above a nominal surface 101 of the component 50 (i.e., extends beyond the exterior surface 82 of the component 50) and can be angled relative to the body 94. A covering 103, such as wax, may cover portions of the diffusion exit surface 98 prior to the casting operation.

One or more of the surface indicator features 100 may be formed on either or both of the sides 105, 107 of the diffusion exit surface 98. The surface indicator features 100 may extend from the diffusion exit surface 98 at differing distances and signify an upper control limit 109 and a lower control limit 111 of an acceptable manufacturing tolerance. The surface indicator features 100 form the surface indicators 84 in the manufactured component 50. In other words, the surface indicator features 100 leave marks in the component 50 to indicate whether the component 50 is within an acceptable manufacturing tolerance (i.e., whether the exit surface 81 is above or at the upper control limit 109 (see FIG. 4A), below or at the lower control limit 111 (see FIG. 4B), or at the nominal surface 101 (see FIG. 4C)).

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
   a body portion;
   a cooling circuit disposed within said body portion and including at least a first cavity, a core in fluid communication with said first cavity, and an exit surface that extends through an exterior surface of said body portion; and
   at least one surface indicator is formed at said exit surface and visible near said exit surface, wherein said at least one surface indicator is visible near at least one of a leading edge, a trailing edge, an inner diameter and an outer diameter of a discharge opening of said exit surface.

2. The component as recited in claim 1, wherein said body portion is an airfoil of at least one of a blade and a vane.

3. The component as recited in claim 1, wherein said body portion is part of a blade outer air seal (BOAS).

4. The component as recited in claim 1, wherein said body portion is part of a mid-turbine frame.

5. The component as recited in claim 1, wherein said body portion is part of a combustor panel.

6. The component as recited in claim 1, comprising a plurality of surface indicators visible near said exit surface.

7. The component as recited in claim 6, wherein a first portion of said plurality of surface indicators are located at said leading edge of said discharge opening of said exit surface and a second portion of said plurality of surface indicators are located at said trailing edge of said discharge opening.

8. The component as recited in claim 1, wherein said at least one surface indicator is presented in a predetermined pattern that indicates whether the component is within an acceptable manufacturing tolerance.

9. The component as recited in claim 1, wherein said core is a microcircuit.

10. The component as recited in claim 1, wherein said core is a trailing edge, pressure side discharge core.

11. A method for determining whether a component is within an acceptable manufacturing tolerance, comprising the steps of:
    inspecting the component to determine whether a surface indicator is visible near an exit surface of the component after the component has been manufactured, wherein said surface indicator is visible near at least one of a leading edge, a trailing edge, an inner diameter and an outer diameter of a discharge opening of said exit surface;
    inspecting the component to determine whether a second surface indicator is visible near said exit surface of the component after the component has been manufactured, wherein said second surface indicator is visible near at least one of said leading edge, said trailing edge, said inner diameter and said outer diameter of said discharge opening, wherein said surface indicator is located at said leading edge of said discharge opening of said exit surface and said second surface indicator is located at said trailing edge of said discharge opening; and
    determining whether the component is within the acceptable manufacturing tolerance based on a predetermined pattern of the surface indicator that is visible in the component.

12. The method as recited in claim 11, wherein the component includes a cooling circuit having at least a first cavity, a core in fluid communication with the first cavity, and an exit surface that extends through an exterior surface of the component.

13. The method as recited in claim 11, comprising the step of performing a secondary operation on the component where the predetermined pattern reveals that the exit surface is above or at an upper control limit of the acceptable manufacturing tolerance.

14. The method as recited in claim 11, comprising the step of rejecting the component where the predetermined pattern reveals that the exit surface is below or at a lower control limit of the acceptable manufacturing tolerance.

15. A casting system for manufacturing a component, comprising:
    a casting article having:
       a body;
       a diffusion exit surface connected to a first portion of said body and configured to extend above a nominal surface of said component; and
       at least one surface indicator feature extending from said diffusion exit surface and being configured to leave a mark in said component.

16. The casting system as recited in claim 15, wherein said casting article is one of a ceramic core or a refractory metal core (RMC).

17. The casting system as recited in claim 15, comprising at least one entrance rod connected to a second portion of said body.

18. The component as recited in claim 1, wherein said at least one surface indicator is a generally thumbnail shaped formation.

19. The component as recited in claim 1, wherein said at least one surface indicator is located at a sloped wall of said exit surface.

20. The component as recited in claim 1, wherein said at least one surface indicator is formed within said discharge opening.

\* \* \* \* \*